United States Patent
Puri et al.

(10) Patent No.: US 12,382,183 B2
(45) Date of Patent: Aug. 5, 2025

(54) ADAPTIVE ALGORITHM FOR POWER EFFICIENT EYE TRACKING

(71) Applicant: QUALCOMM Incorporated, San Diego, CA (US)

(72) Inventors: Prachir Puri, Hyderabad (IN); Venkatesh Sadineni, Hyderabad (IN); Satwik Mohanty, Hyderabad (IN); Veera Venkata Charan Junnu, Peddapuram (IN)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 18/165,175

(22) Filed: Feb. 6, 2023

(65) Prior Publication Data
US 2024/0267632 A1    Aug. 8, 2024

(51) Int. Cl.
*H04N 23/74* (2023.01)
*H04N 23/56* (2023.01)
*H04N 23/71* (2023.01)

(52) U.S. Cl.
CPC ............. *H04N 23/74* (2023.01); *H04N 23/56* (2023.01); *H04N 23/71* (2023.01)

(58) Field of Classification Search
CPC ......... H04N 23/74; H04N 23/56; H04N 23/71
See application file for complete search history.

(56) References Cited

U.S. PATENT DOCUMENTS

| | | | |
|---|---|---|---|
| 8,025,405 B2 * | 9/2011 | Rehnstrom | G06T 7/246 351/210 |
| 9,289,122 B2 * | 3/2016 | Chinnock | A61B 3/14 |
| 10,528,127 B2 * | 1/2020 | Caraffi | G06F 3/013 |
| 2022/0397956 A1 * | 12/2022 | Lundell | G02B 27/0093 |
| 2023/0421908 A1 * | 12/2023 | Rana | H04N 23/74 |

OTHER PUBLICATIONS

International Search Report and Written Opinion—PCT/US2023/083906—ISA/EPO—Apr. 9, 2024.

* cited by examiner

*Primary Examiner* — Dramos Kalapodas
(74) *Attorney, Agent, or Firm* — Polsinelli/Qualcomm

(57) ABSTRACT

Systems and techniques are provided for eye tracking. For instance, a computing device can obtain an image of an eye. The image of the eye includes a glint of light from a light source. The computing device can determine information associated with the glint of light based on the image of the eye. The computing device can obtain one or more target glint parameter values and can compare the information associated with the glint of light to the one or more target glint parameter values. The computing device can adjust an amount of power for the light source based on comparing the information associated with the glint of light and the one or more target glint parameter values.

27 Claims, 11 Drawing Sheets

ADAPTIVE ALGORITHM FOR POWER EFFICIENT EYE TRACKING

FIELD

The present disclosure generally relates to eye tracking. For example, aspects of the present disclosure relate to systems and techniques for performing an adaptive algorithm for a power efficient eye tracking scheme.

BACKGROUND

Extended reality technologies can be used to present virtual content to users, and/or can combine real environments from the physical world and virtual environments to provide users with XR experiences. The term XR can encompass VR, AR, mixed reality, and the like. Extended reality systems can allow users to experience XR environments by overlaying virtual content onto images of a real world environment, which can be viewed by a user through an XR device (e.g., a head-mounted display, extended reality glasses, or other device). An extended reality (XR) device is a device that displays an environment to a user, for example through a head-mounted display (HMD) or other device. The environment is at least partially different from the real-world environment in which the user is in. The user can generally change their view of the environment interactively, for example by tilting or moving the HMD or other device.

In some cases, an XR system can include a "see-through" display that allows the user to see their real-world environment based on light from the real-world environment passing through the display. In some cases, an XR system can include a "pass-through" display that allows the user to see their real-world environment, or a virtual environment based on their real-world environment, based on a view of the environment being captured by one or more cameras and displayed on the display. "See-through" or "pass-through" XR systems can be worn by users while the users are engaged in activities in their real-world environment.

In some cases, the XR system can include an eye imaging (also referred to herein as gaze detection or eye tracking) system. In some cases, eye tracking may be used to analyze the eye movements to estimate the gaze for certain applications, such as XR applications. Eye tracking may be used to help harness information, such as a pupil position, a gaze vector for each eye, and a gaze point.

SUMMARY

Systems and techniques are described herein for eye tracking. The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

In one illustrative example, a method for eye tracking is provided. The method includes: obtaining an image of an eye, the image of the eye including a glint of light from a light source; determining information associated with the glint of light based on the image of the eye; obtaining one or more target glint parameter values; comparing the information associated with the glint of light to the one or more target glint parameter values; and adjusting an amount of power for the light source based on comparing the information associated with the glint of light and the one or more target glint parameter values.

As another example, an apparatus for eye tracking is provided. The apparatus includes at least one memory; and at least one processor coupled to the at least one memory. The at least one processor is configured to: obtain an image of an eye, the image of the eye including a glint of light from a light source; determine information associated with the glint of light based on the image of the eye; obtain one or more target glint parameter values; compare the information associated with the glint of light to the one or more target glint parameter values; and adjust an amount of power for the light source based on comparing the information associated with the glint of light and the one or more target glint parameter values.

In another example, a non-transitory computer-readable medium having stored thereon instructions is provided. The instructions, when executed by at least one processor, cause the at least one processor to: obtain an image of an eye, the image of the eye including a glint of light from a light source; determine information associated with the glint of light based on the image of the eye; obtain one or more target glint parameter values; compare the information associated with the glint of light to the one or more target glint parameter values; and adjust an amount of power for the light source based on comparing the information associated with the glint of light and the one or more target glint parameter values.

As another example, an apparatus for eye tracking is provided. The apparatus includes means for obtaining an image of an eye, the image of the eye including a glint of light from a light source; means for determining information associated with the glint of light based on the image of the eye; means for obtaining one or more target glint parameter values; means for comparing the information associated with the glint of light to the one or more target glint parameter values; and means for adjusting an amount of power for the light source based on comparing the information associated with the glint of light and the one or more target glint parameter values.

In some aspects, one or more of the apparatuses described herein can include or be part of an extended reality device (e.g., a virtual reality (VR) device, an augmented reality (AR) device, or a mixed reality (MR) device), a mobile device (e.g., a mobile telephone or other mobile device), a wearable device (e.g., a network-connected watch or other wearable device), a personal computer, a laptop computer, a server computer, a television, a video game console, or other device. In some aspects, the apparatus further includes at least one camera for capturing one or more images or video frames. For example, the apparatus can include a camera (e.g., an RGB camera, IR camera) or multiple cameras for capturing one or more images and/or one or more videos including video frames. In some cases, the apparatus may also include IR light emitting diodes (LEDs) or an assembly of lasers and/or diffractive optical elements. In some aspects, the apparatus includes a display for displaying one or more images, videos, notifications, or other displayable data. In some aspects, the apparatus includes a transmitter configured to transmit data or information over a transmission medium to at least one device. In some aspects, the processor includes a central processing unit (CPU), a graphics processing unit (GPU), a neural processing unit (NPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
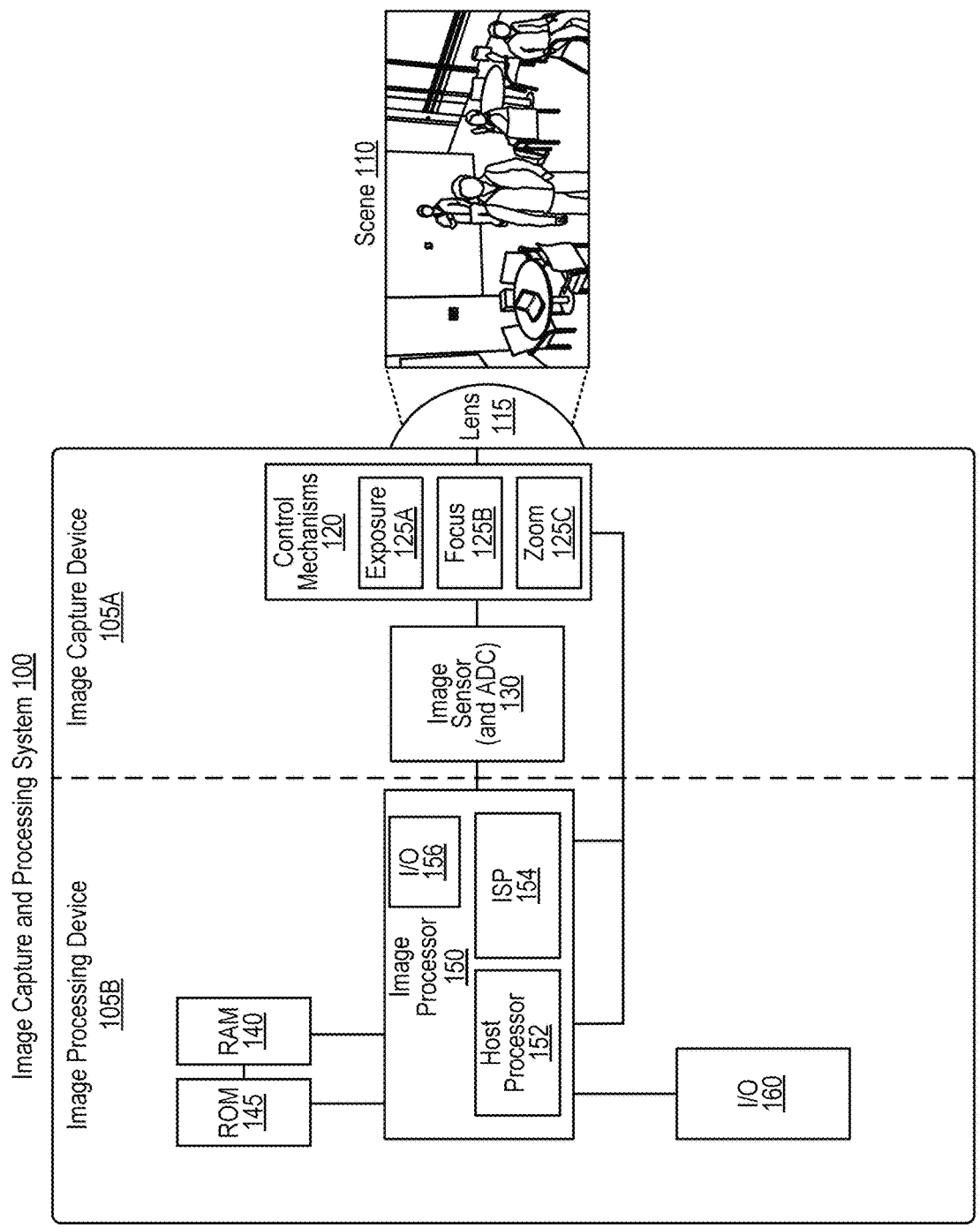
FIG. 1 is a block diagram illustrating an architecture of an image capture and processing system, in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Various devices or systems can use eye tracking to perform one or more operations, including Extended reality (XR) systems or devices, vehicles (or computing systems of vehicles), robotics systems or devices, among others. For example, XR systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

An XR system can include one or more user-facing sensors that face the user, such as user-facing image sensors (or cameras) that face the user. In some cases, the user-facing sensors can face the user's face, eyes, one or more other portions of the user's body, and/or a combination thereof. In some cases, the XR system may include an eye tracking system for tracking one or more eyes of the user. Eye tracking may be used to by applications executing on the XR system to harness information, such as a pupil position, a gaze vector for each eye, and a gaze point, for example, to control the XR system and/or applications. In some cases, eye tracking systems may reflect and/or scatter a light from a light source off of an eye of a user and detect a reflected glint of light from the light source. Based on movement of the pupil with respect to glint, movement of the eye may be tracked. In some cases, a brightness (e.g., intensity) of the glint may be based on an amount of light output by the light source. This brightness may vary based on a distance the light source is from the eye. Among users, a facial shape and eye shape can influence how far the light source is from the eye. As an intensity of the light (and resultant glint) is inversely proportional to the square of the distance, relatively small changes in the distance between the eye and the light source can make a large difference in the amount of light sufficient to generate a useful glint. Additionally, if the light source is too bright, in addition to wasting power, the brightness of the light, at certain distances, may exceed light exposure guidelines. Thus, it may be useful to adjust a brightness, for example by adjusting an amount of power, of the illumination source for eye tracking.

Systems, apparatuses, electronic devices, methods (also referred to as processes), and computer-readable media (collectively referred to herein as "systems and techniques") are described herein for an adaptive algorithm for power efficient eye tracking. For example, an eye tracker may be configured to determine certain information associated with a glint of light reflected off of an eye, such as a brightness of the glint and area of the glint. The eye tracker may also obtain target glint parameters values. The eye tracker may then adjust power levels of the light source to match parameter values of the information associated with the glint to the target glint parameter values.

In some cases, adjusting the power levels of the light source, allows the eye tracker to dynamically adjust to how far the light source is from an eye. This adjustment helps allow the brightness of the light to be adjusted for different users, or even for movement of the eye tracker. This may help save power and ensures that the brightness of the light as reflected/scattered by the eye does not exceed light exposure guidelines.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 105) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image capture and processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 11:
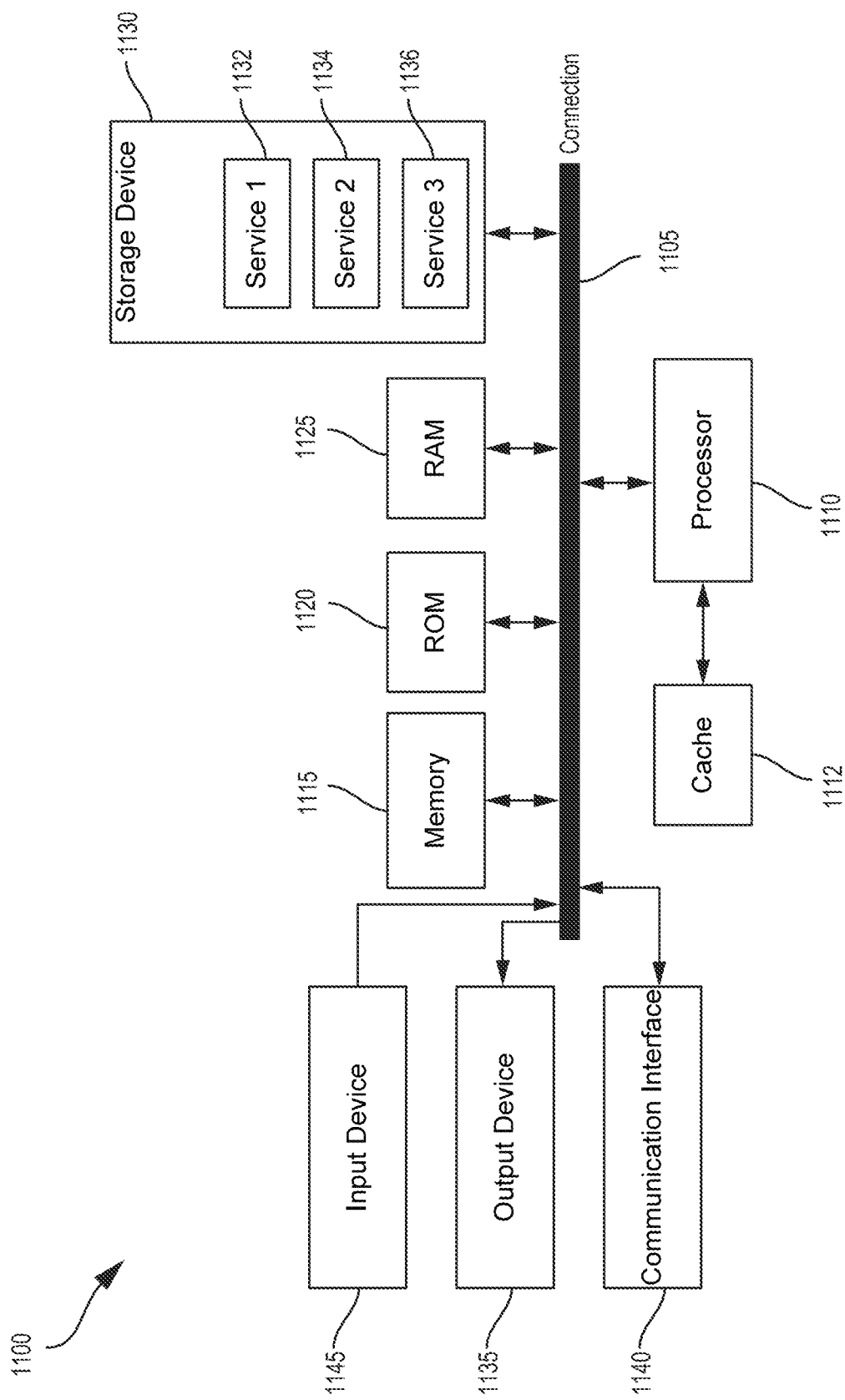
FIG. 11 is a diagram illustrating an example of a system for implementing certain aspects of the present technology.

The image processor 150 may include one or more processors, such as one or more image signal processors (ISPs) (including ISP 154), one or more host processors (including host processor 152), and/or one or more of any other type of processor 1110 discussed with respect to the computing system 1100 of FIG. 11. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or some combination thereof. In some cases, a caption may be input into the image processing device 105B through a physical keyboard or keypad of the I/O devices 160, or through a virtual keyboard or keypad of a touchscreen of the I/O devices 160. The I/O devices 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O devices 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 105, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.10 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
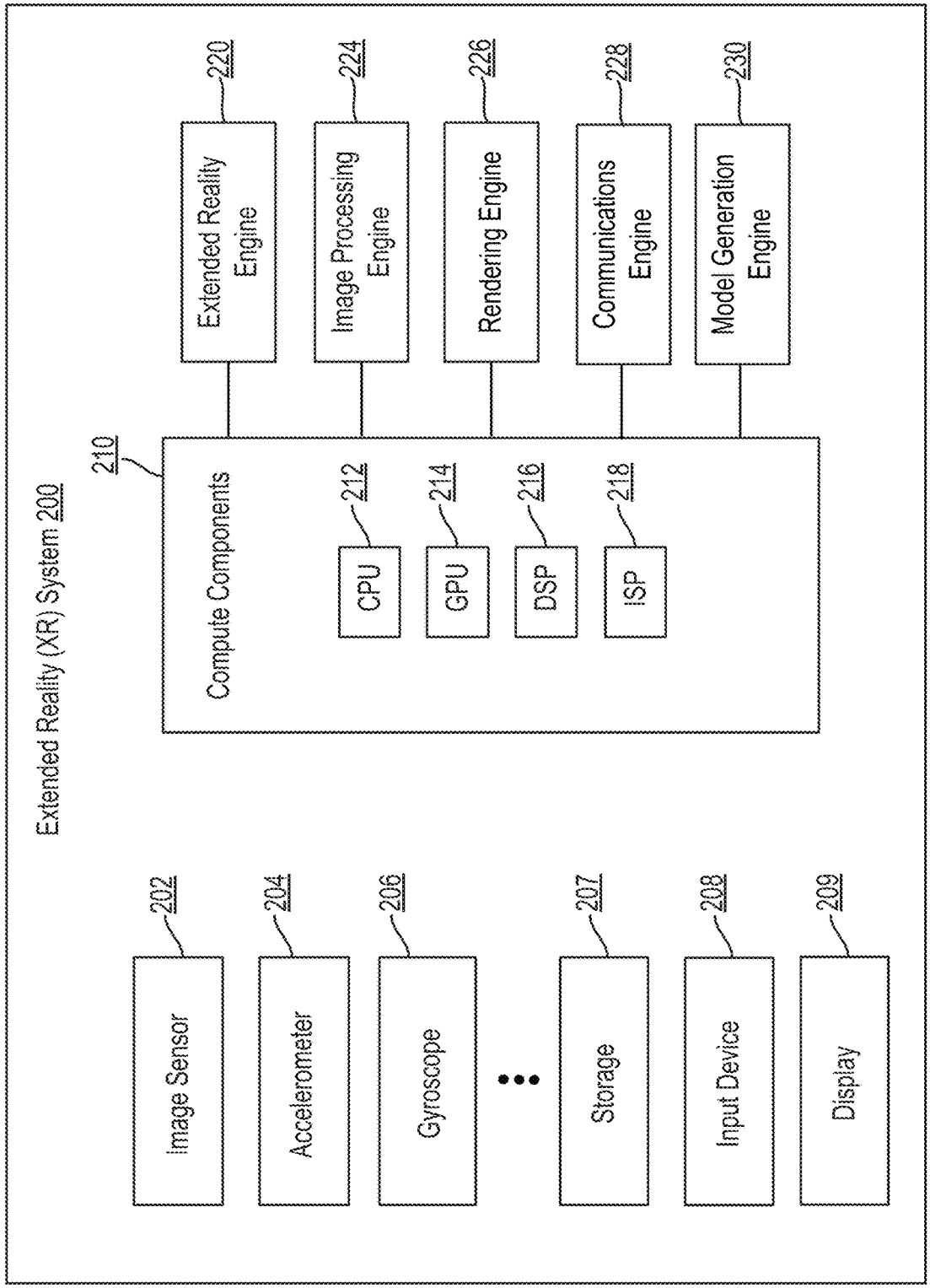
FIG. 2 is a diagram illustrating an architecture of an example extended reality (XR) system, in accordance with some examples.

FIG. 2 is a diagram illustrating an architecture of an example extended reality (XR) system 200, in accordance with some aspects of the disclosure. In some examples, the XR system 200 of FIG. 2 can include the image capture and processing system 100, the image capture device 105A, the image processing device 105B, or a combination thereof. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an image processing engine 224, a rendering engine 226, a communications engine 228, and a model generation engine 230. It should be noted that the components 202-230 shown in FIG. 2 are non-limiting examples provided for illustrative and explanation purposes, and other examples can include more, fewer, or different components than those shown in FIG. 2. For example, in some cases, the XR system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors. audio sensors, etc.), one or more display devices, one more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device 1145 discussed herein, or any combination thereof. In some cases, the image sensor 202 can capture images that can be processed for interpreting gesture commands.

The XR system 200 can also communicate with one or more other electronic devices (wired or wirelessly). For example, communications engine 228 can be configured to manage connections and communicate with one or more electronic devices. In some cases, the communications engine 228 can correspond to the communications interface 1140 of FIG. 11.

In some cases, the XR system 200 may generate 3D reconstructions of objects using, for example, a sequence of frames of a target object. For example, model generation engine 230 may be configured to obtain images and generate a 3D reconstruction of an object based on the obtained images.

In some implementations, the one or more image sensors 202, the accelerometer 204, the gyroscope 206, storage 207, compute components 210, XR engine 220, image processing engine 224, rendering engine 226, communications engine 228, and model generation engine 230 can be part of the same computing device. For example, in some cases, the one or more image sensors 202, the accelerometer 204, the gyroscope 206, storage 207, compute components 210, XR engine 220, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, image processing engine 224, rendering engine 226, communications engine 228, and model generation engine 230 can be part of two or more separate computing devices. For example, in some cases, some of the components 202-230 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the image processing engine 224, data from the rendering engine 226 (e.g., output frames), data from the communications engine, and/or data from the model generation engine 230 (e.g., 3D reconstructions). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the image processing engine 224, the rendering engine 226, and the model generation engine 230. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the image processing engine 224, the rendering engine 226 and/or the model generation engine 230 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown). SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

As one illustrative example, the compute components 210 can extract feature points corresponding to a mobile device (e.g., XR system of FIG. 2, HMD 910 of FIGS. 9A and 9B, mobile device 1050 of FIGS. 11A and 11B), or the like. In some cases, feature points corresponding to the mobile device can be tracked to determine a pose of the mobile device. As described in more detail below, the pose of the mobile device can be used to determine a location for projection of AR media content that can enhance media content displayed on a display of the mobile device.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3:
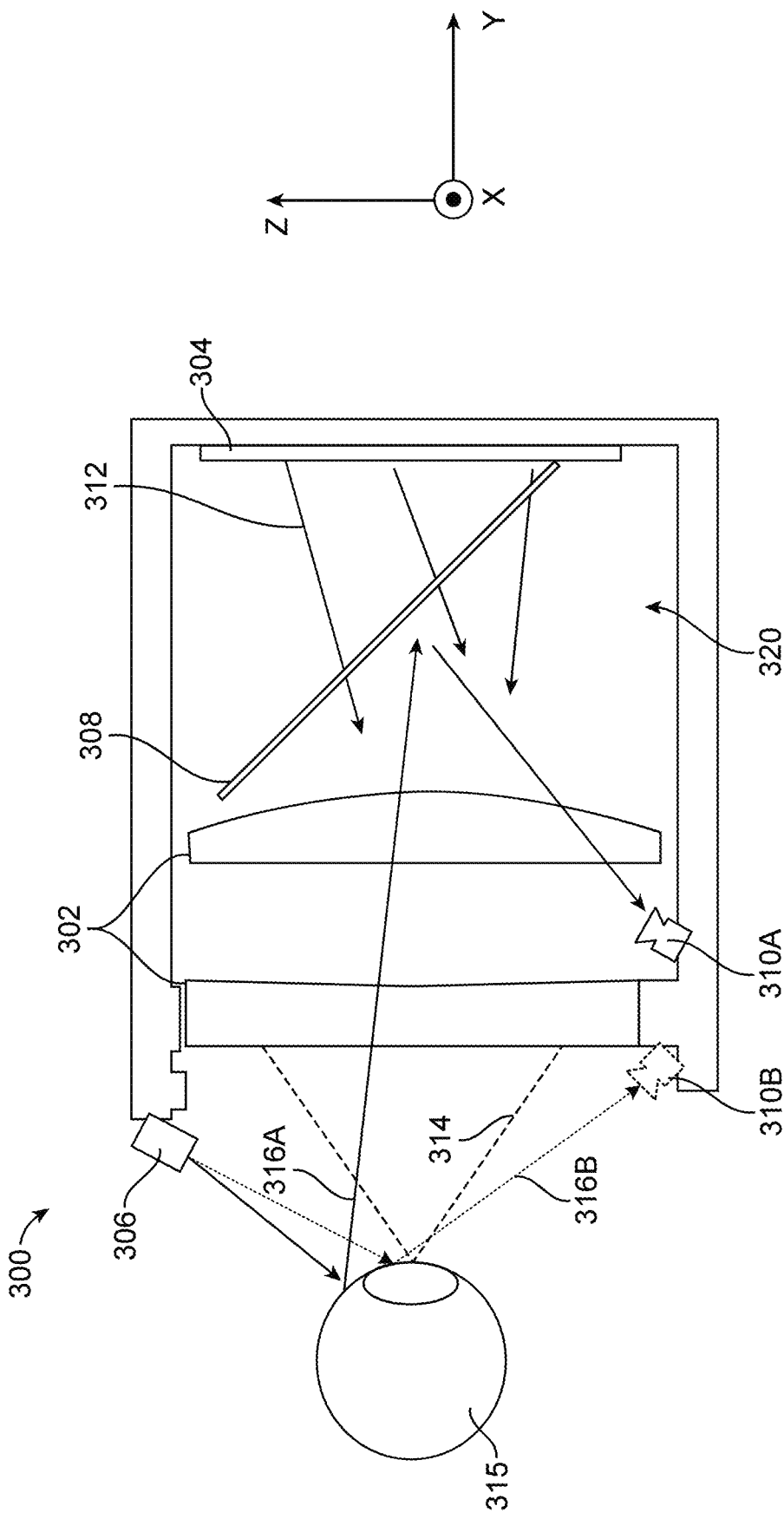
FIG. 3 is a diagram illustrating a simplified cross-sectional view of lens assembly, in accordance with some examples.

FIG. 3 is a diagram illustrating a simplified cross-sectional view of lens assembly 300 (e.g., of an HMD). In the illustrated example of FIG. 3, the lens assembly 300 includes a lens system 302, a display 304, an illumination source 306, a light directing component 308, and an image sensor 310A/310B (collectively image sensor 310).

As illustrated, light from the display 304 can pass through the light directing component 308 and be focused by the lens system 302 on the user's eye 315. In some implementations, the light directing component 308 can be configured to allow visible light from the display 304 to pass through. In the illustrated example of FIG. 3, the light directing component 308 is positioned within a cavity 320 of the lens assembly 300 between the lens system 302 and the display 304. As illustrated in FIG. 3, the visible light 312 can be focused at the position of the user's eye 315 as illustrated by the lines 314. The illumination source 306 can be an IR illumination source (e.g., an IR LED) that illuminates the user's eye 315. In some cases, multiple illumination sources 306 may be used. When the IR light reaches the user's eye, a scattered and/or reflected portion of the light, such as the example ray 316A, can reach the light directing component 308 and reflect toward the image sensor 310A.

In some cases, the image sensor 310B may positioned such that the image sensor 310B is facing towards the user's eye 315. The illumination source 306 (or multiple illumination sources) may be positioned to direct light, such as IR light, so that the light is scattered and/or reflected, such as shown in exemplary ray 316B, can reach the image sensor 310B. In some cases, where the image sensor 310B is configured to face the user's eye 315, the light directing component 308 may be omitted.

The image sensor 310 can be an infrared (IR) image sensor that can detect the scattered and/or reflected light (e.g., glint) from the eye to form one or more images. In some cases, an XR system can obtain image data from the image sensor 310 and track the user's eye position and/or gaze direction based on the obtained data. For example, the image sensor 310 may track eye movements based on how the glint of IR light reflected or scattered by the eye moves.

While examples are described herein for eye tracking in XR systems, the eye tracking systems and techniques described herein can be used for eye tracking with other types of devices and with other geometries. Of note, the illustration in FIG. 3 is not to scale and is provided only for the purposes of illustration. In addition, more or fewer components can be included in the lens assembly 300 of FIG. 3 without departing from the scope of the present disclosure.

In some cases, the position of a user's eyes relative to the lens assembly 300 can vary. For example, each individual user may have different eyes size, face shape, face symmetry, eye separation, facial feature alignment, and/or a combination thereof. In some implementations, an eye tracking system can be configured to perform eye tracking over a specified range of eye positions and/or rotations using the image data collected, for example, from the image sensor 310.

Figure 4:
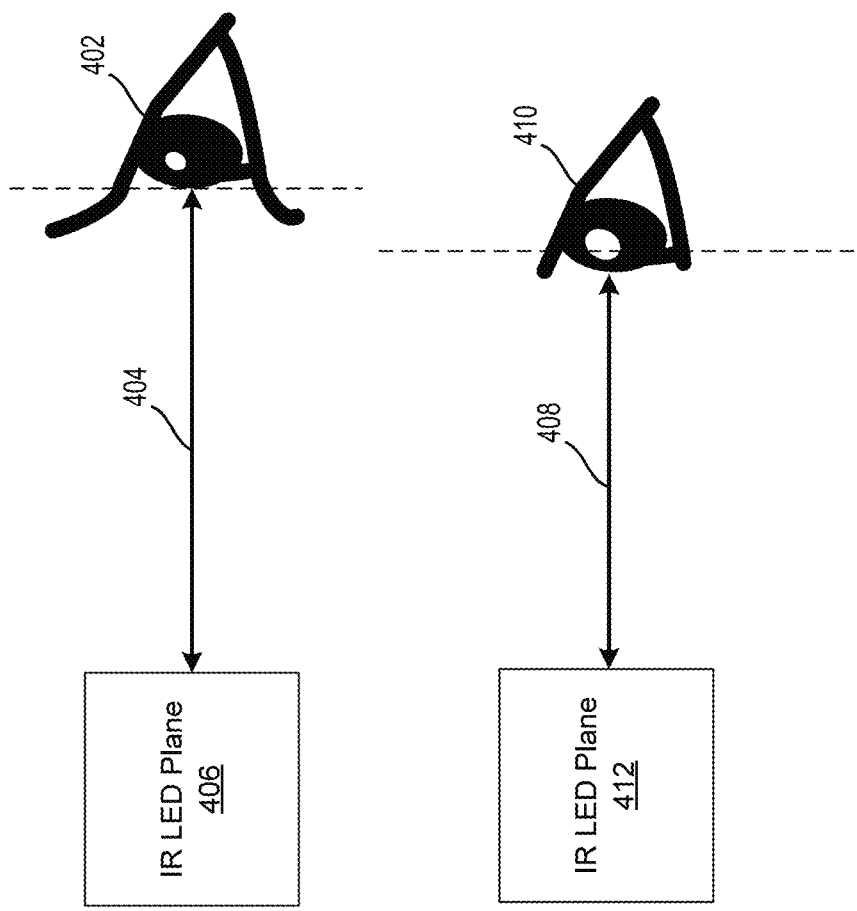
FIG. 4 illustrates how eye and facial shapes can influence illumination of the eye for eye tracking, in accordance with some examples.

In some cases, eye tracking may be performed using multiple illumination sources 306 and these illumination sources may be configured to emit a constant amount of light. Generally, how light reflects off an eye can vary based on a user's eye and face. FIG. 4 illustrates how eye and facial shapes can influence illumination of the eye for eye tracking. For example, where a first user 402 has relatively more recessed eyes, a first distance 404 between the first user's 402 eye and a first IR LED plane 406 (e.g., plane on which the illumination sources 306 are located) may be greater than a second distance 408 between a second user's 410 eye and a second IR LED plane 412, where the second user's eye 410 is relatively more protruding. In some cases, where the illumination source is configured to emit a constant amount of light, a dimmer and smaller glint may be formed for the first user 402 as compared to a brighter and larger glint for the second user's eye 410. In addition, the distance between the IR LED planes 406 and 412 and the first user's eye 402 and second user's eye 410 may vary for the same user based on a position of, for example, the portable device, such as a HMD and this varying distance cause the glint to vary for the same user. As an intensity of the light (and resultant glint) is inversely proportional to the square of the distance, relatively small changes in the distance between the eye and the light source can make a large difference in the amount of light sufficient to generate a useful glint. Additionally, IR LEDs, or other components of the eye tracker, such as those discussed with respect to FIG. 5, may age over time and may become dimmer for a certain amount of input power over time, thus reducing an amount of IR light to produce the glint. In some cases, a smaller and/or dimmer glint may lead to inaccuracy for eye tracking, while an overly bright glint may be power inefficient and/or could potentially be detrimental to the eye with long exposure. Therefore, it may be useful to adjust a brightness, for example by adjusting an amount of power, of the illumination source for eye tracking.

Figure 5:
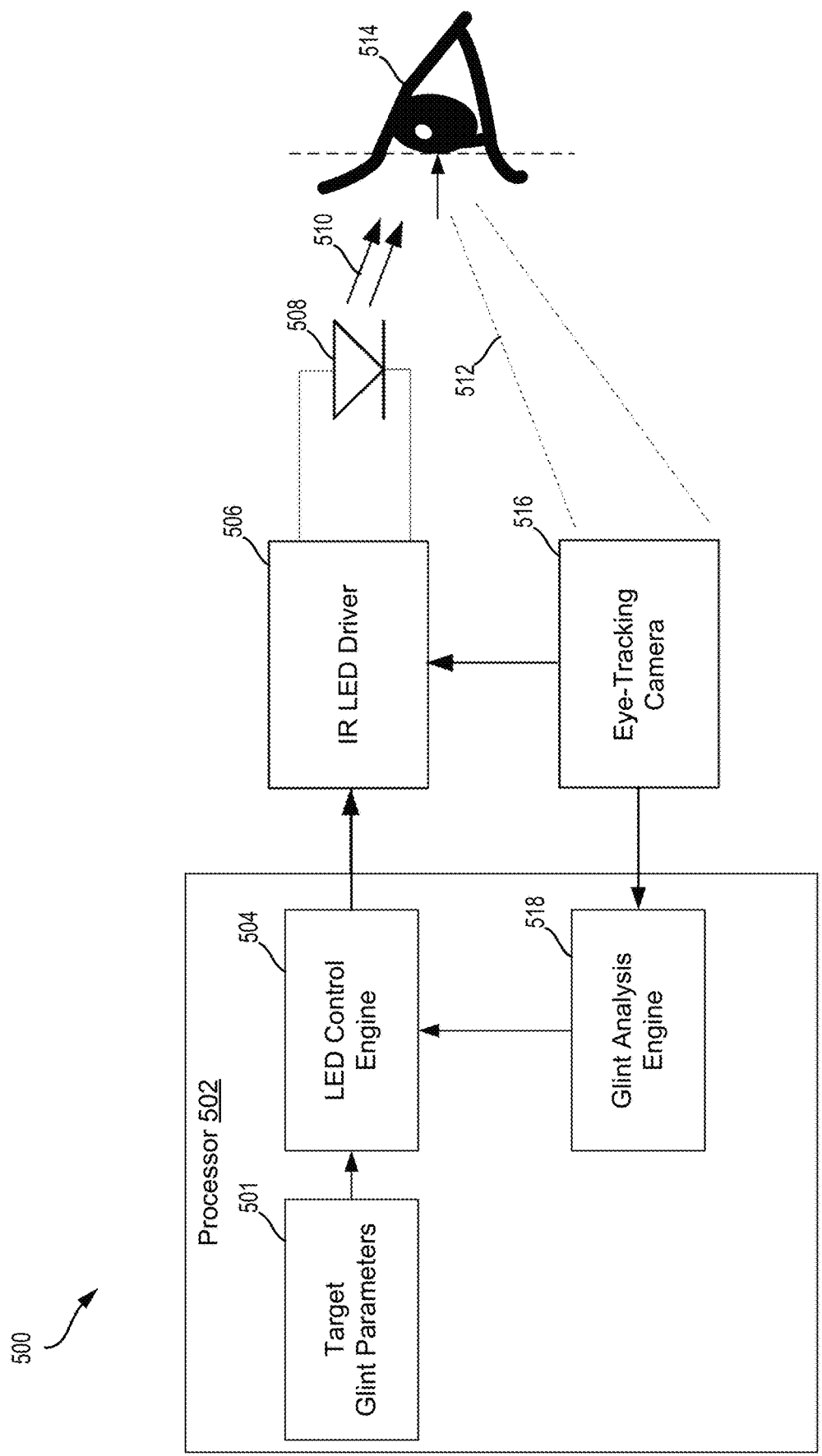
FIG. 5 is a block diagram illustrating a system implementing an adaptive algorithm for power efficient eye tracking, in accordance with aspects of the present disclosure.

FIG. 5 is a block diagram illustrating a system 500 implementing an adaptive algorithm for power efficient eye tracking, in accordance with aspects of the present disclosure. System 500 includes a processor 502 and the processor 502 may execute an LED control engine 504. The LED control engine 504 may be coupled to and control an IR LED driver 506. For example, the LED control engine 504 may indicate to the IR LED driver 506 to increase or decrease (or shut off) a brightness of one or more IR LEDs 508 coupled to the IR LED driver 506. The IR LED driver 506 may control the operations of one or more IR LEDs 508, for example, by controlling an amount of current to the one or more IR LEDs 508.

The one or more IR LEDs 508 may transmit IR light 510 that may be reflected/scattered 512 by an eye 514. This reflected/scattered 512 IR light from the eye 514 may be imaged by an eye-tracking camera 516. The eye-tracking camera 516 may be coupled to a glint analysis engine 518 that may analyze images from the eye-tracking camera 516. In some cases, the glint analysis engine 518 may analyze the glint (e.g., IR light reflected/scattered 512 by the eye 514) to determine information associated with the glint (e.g., target glint parameters 501). In some cases, the information associated with the glint may include a brightness of pixels of the glint, an area of the glint, and the like.

The glint analysis engine 518 may pass the information associated with the glint to LED control engine 504. The LED control engine 504 may also receive target glint parameters 501. In some cases, the target glint parameters 501 may include target values for the information associated with the glint. The glint parameters 501 may include parameter values corresponding to values in the information associated with the glint. The LED control engine 504 may adjust the power/duty cycle of the IR LEDs so that the information associated with the glint comes in line with (e.g., matches) values in the target glint parameters 501. This allows the LED control engine 504 to balance a size/brightness of the glint and power usage, while remaining within guidelines for light exposure such as IEC 62471. In some cases, the target glint parameters 501 may be predetermined, for example, experimentally during research and development. In some cases, the target glint parameter values may be fixed for a set of devices.

The LED control engine 504 may then compare the information associated with the glint to the target glint parameters 501 and adjust the brightness of the one or more IR LEDs 508 based on the comparison. For example, the LED control engine 504 may increase a brightness of the one or more IR LEDs 508 if glint parameters of the information associated with the glint are lower than the target glint parameters 501. Similarly, the LED control engine 504 may decrease a brightness of the one or more IR LEDs 508 if glint parameters of the information associated with the glint are higher than the target glint parameters 501. In some cases, adjusting a brightness of the IR LEDs 508 may be performed by increasing or decreasing an amount of power for the one or more IR LEDs 508. In some cases, as LEDs age, the LEDs may become dimmer for a certain amount of power. Adjusting the brightness (e.g., amount of power to the LEDs) based on target glint parameters 501 may help compensate for LED dimming with age.

Figure 6:
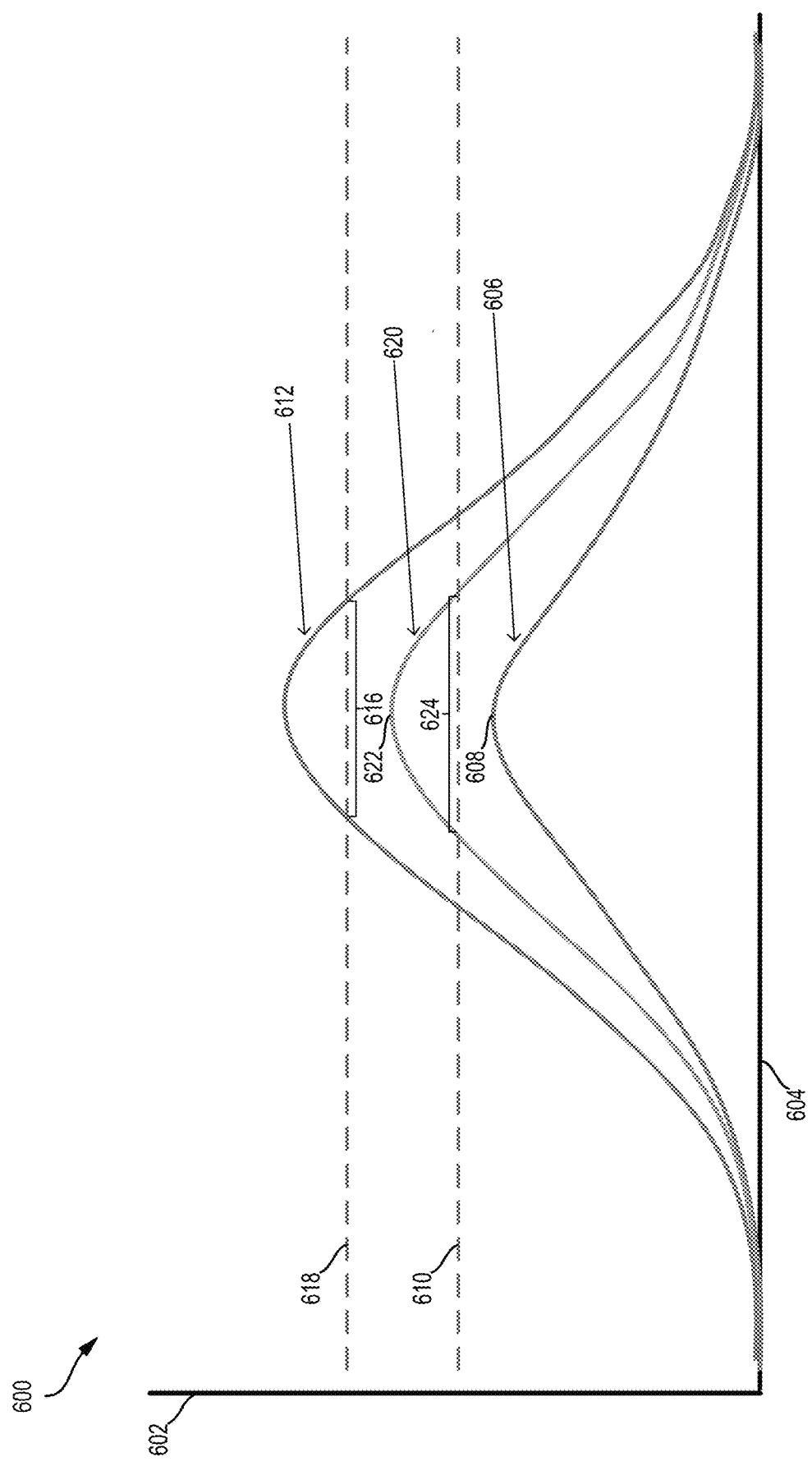
FIG. 6 is a chart illustrating a distribution of brightness for pixels of a glint in an image, in accordance with aspects of the present disclosure.

FIG. 6 is a chart 600 illustrating a distribution of brightness for pixels of a glint in an image, in accordance with aspects of the present disclosure. In chart 600 brightness (intensity) is plotted on the vertical axis 602, while pixels of a glint image (e.g., an image of the glint) captured by the eye tracking camera are on the horizontal axis 604. In some cases, a brightness of the pixels has been gaussianized to normalize the brightness curves for clarity. In some cases, the target glint parameter values may include a set of threshold values and/or a set of target values. As an example using threshold values, a first curve 606 may illustrate brightness levels across a set of pixels of a glint at a particular IR LED power level for a first distance between the IR LED and an eye. In some cases, if a peak 608 brightness (e.g., maximum brightness) of the first curve 606 or a number of pixels of the first curve 606 have a brightness that is less than a first threshold value 610, then it may be difficult for eye tracking to be performed using the image. In some cases, this first distance may be relatively longer than distances associated with a second curve 612 or a third curve 620.

The second curve 612 may illustrate brightness levels across a set of pixels of the glint at the same power level for a second distance between the IR LED and an eye. The second distance may be shorter than the first distance. In some cases, if a peak 614 brightness of the second curve 612 or a number of pixels 616 of the second curve 612 have a brightness that is greater than a second threshold value 618, then the brightness may be too high, possibly resulting in excessive power use and possibly also exceeding light exposure guidelines over time, or may saturate the camera sensor. Such high brightness values may be inefficient and possibly dangerous for the eye. Thus, the target glint parameter values may include a set of threshold values, such as an upper threshold and a lower threshold that may be used to adjust the brightness of the illumination source (e.g., IR LEDs).

As another example, a third curve 620 may represent an ideal distance case where the peak 622 brightness and/or number of pixels 624 with at least a certain brightness may be easily tracked and are within eye safe levels. In some cases, the peak 622 brightness and/or number of pixels 624 with at least a certain brightness may be provided as target values for the target glint parameters. The third curve 620 may be associated with a certain brightness (e.g., based on a peak in the vertical axis 602) and area of the glint (e.g., based on an amount of the third curve 620 above the first threshold value 610. In some cases, an eye tracking system may be associated with certain eye tracker glint characteristics, such as a minimum and maximum brightness (e.g., corresponding to the first threshold value 610 and second threshold value 618, respectively) along with a minimum area of the glint (e.g., number of pixels on the horizontal axis 604 above the first threshold value 610). In some cases, target glint parameter values (e.g., such as those in the third curve 620) may be determined based on the eye tracker glint characteristics.

In some cases, brightness curves, such as curves 606, 612, and 620 of FIG. 6 and thresholds, may be determined based on a level of brightness needed by a particular eye tracking system and output of the lighting source (e.g., for the same IR LED power level as the other curves). For example, the output of the lighting source may be measured based on an intensity of light. In some cases, intensity I at a point on eye may be a function of distance r, and the LED radiation characteristics $I_0(\varphi, I_f)$ where $\varphi$ is the angle of incidence and $I_f$ is the forward current of the LED. I may be expressed as $$I(\varphi, I_f, r) = \frac{I_0(\varphi, I_f)}{r^2}.$$

Intensity may be determined at different expected distances for the eye tracker to generate predicted intensities and thresholds (or target values) chosen based on factors such as the sensitivity of the eye tracker, eye safe intensity values, length of expected exposure, saturation light levels, and the like.

Figure 7A:
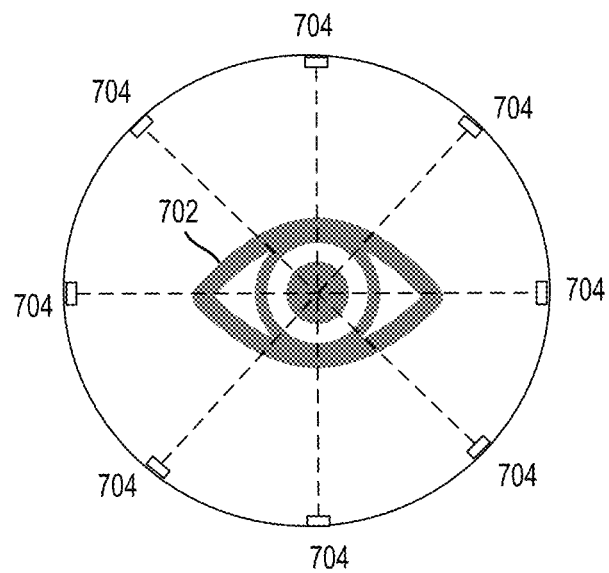
FIGS. 7A and 7B illustrates illuminating an eye using multiple light sources, in accordance with aspects of the present disclosure.

In some cases, the adjustment of the brightness may be performed for a single light source or multiple light sources. In some cases, the multiple light sources may be adjusted together. For example, FIG. 7A illustrates an eye 702 illuminated by eight light sources 704 spaced equidistant from each other. Where multiple light sources are used, the multiple light sources may be configured so that each light source produces a separate glint to increase the accuracy of tracking. In some cases, power to all of the light sources 704 may be controlled together, for example, if the light sources 704 are equidistant from the eye 702.

Figure 7B:
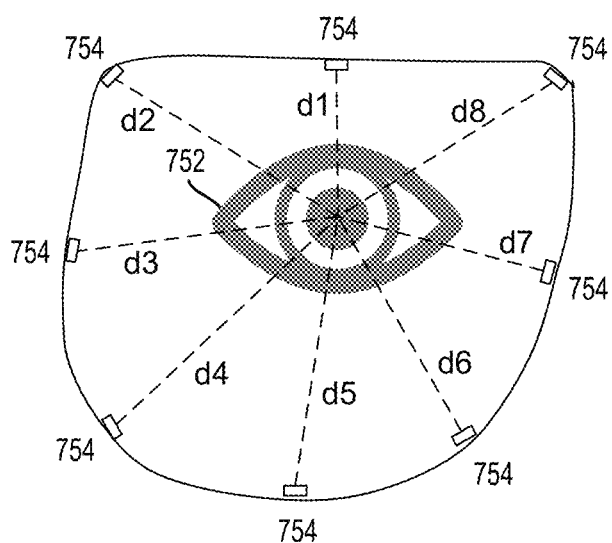

As another example, FIG. 7B illustrates an eye 752 illuminated by eight light sources 754 which are differently spaced around the eye 752. In such a case, assuming individual control of power levels of each of the eight light sources 754, power levels for the eight light sources 754 may be adjusted together, but an exact amount of power provided for each light source of the eight light sources 754 may vary based on the distance (shown as d1, d2, d3, d4, d5, d6, d7, and d8) the respective light source is from the eye 752. In such a case, each light source 754 may be adjusted independently.

Figure 8:
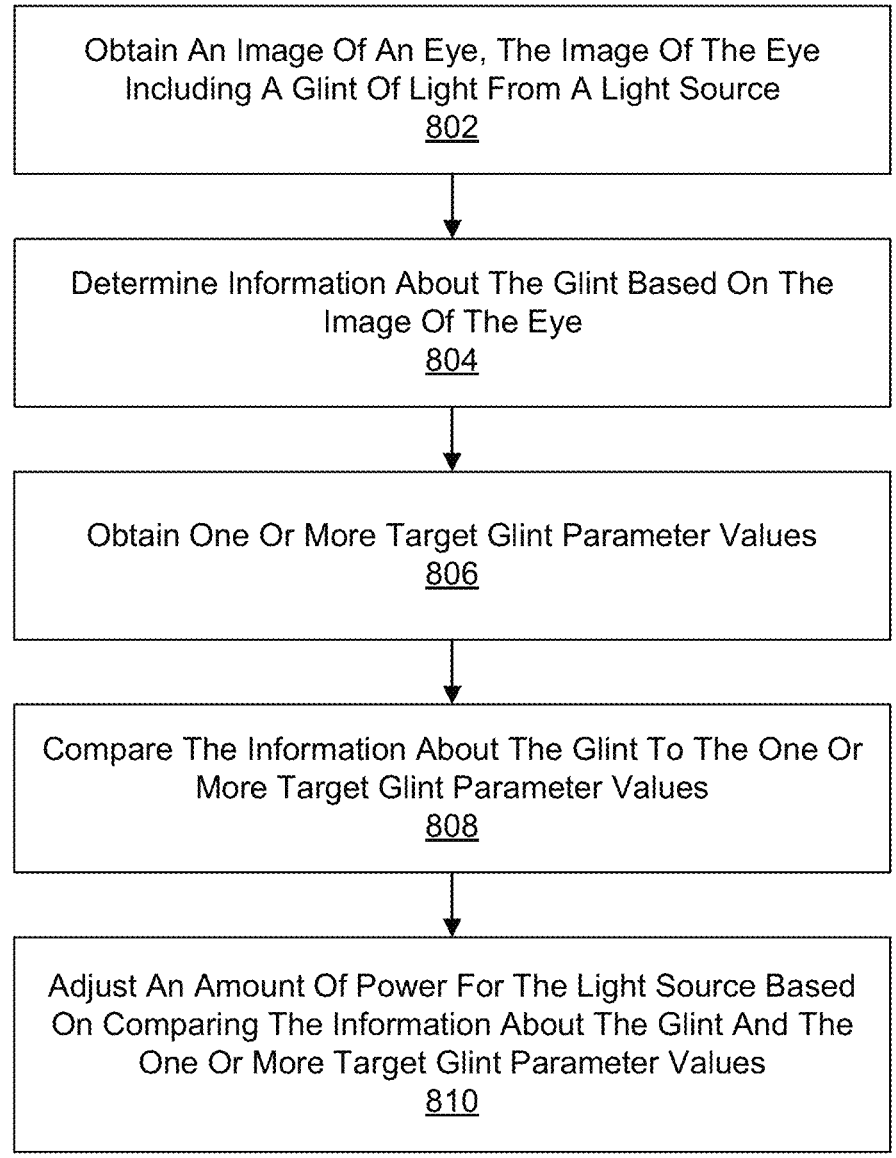
FIG. 8 is a flow diagram illustrating a process for image processing, in accordance with aspects of the present disclosure.

FIG. 8 is a flow diagram illustrating a process 800 for image processing, in accordance with aspects of the present disclosure. The process 800 may be performed by a computing device (or apparatus) or a component (e.g., a chipset, codec, etc.) of the computing device (e.g., image processor 150 of FIG. 1, compute components 210 of FIG. 2, processor 1110 of FIG. 11). The computing device may be a mobile device (e.g., a mobile phone), a network-connected wearable such as a watch, an extended reality (XR) device such as a virtual reality (VR) device or augmented reality (AR) device (e.g., HMD 910 of FIG. 9A, 9B, mobile handset 1050 of FIG. 10A, 10B), a vehicle or component or system of a vehicle, or other type of computing device. The operations of the process 800 may be implemented as software components that are executed and run on one or more processors (e.g., image processor 150 of FIG. 1, the CPU 212, the GPU 214, the DSP 216, and/or the ISP 218 of FIG. 2, the processor 1110 of FIG. 11, and/or other processor(s)). In some cases, the operations of the process 800 can be implemented by a system having the architecture 1100 of FIG. 11.

At block 802, the computing device (or component thereof) may obtain an image of an eye, the image of the eye including a glint of light from a light source (e.g., illumination source 306, IR LEDs 508 of FIG. 5, light source 704 of FIG. 7A, or light source 754 of FIG. 7B). In some cases, the light source comprises one or more infrared light sources. In some cases, the glint of light comprises light from the light source scattered or reflected from the eye.

At block 804, the computing device (or component thereof) may determine information associated with the glint of light based on the image of the eye. In some cases, the information associated with the glint of light comprises a set of parameters including an area of the glint of light and a maximum brightness value of the glint of light.

At block 806, the computing device (or component thereof) may obtain one or more target glint parameter values. In some cases, the one or more target glint parameter values are predetermined based on eye tracker glint characteristics associated with an eye tracker.

At block 808, the computing device (or component thereof) may compare the information associated with the glint of light to the one or more target glint parameter values. In some cases, to compare the information associated with the glint of light to the one or more target glint parameter values, the computing device (or component thereof) may compare a parameter of the information associated with the glint of light to a set of thresholds of a corresponding parameter value of the one or more target glint parameter values. In some cases, to compare the information associated with the glint of light to the one or more target glint parameter values, the computing device (or component thereof) may compare a parameter of the information associated with the glint of light to a corresponding target parameter value of the one or more target glint parameter values.

At block 810, the computing device (or component thereof) may adjust an amount of power for the light source based on comparing the information associated with the glint of light and the one or more target glint parameter values. In some cases, to adjust the amount of power, the computing device (or component thereof) may increase or decrease an amount of power provided to the light source. In some cases, adjusting the amount of power for the light source compensates for aging of the light source.

Figure 9A:
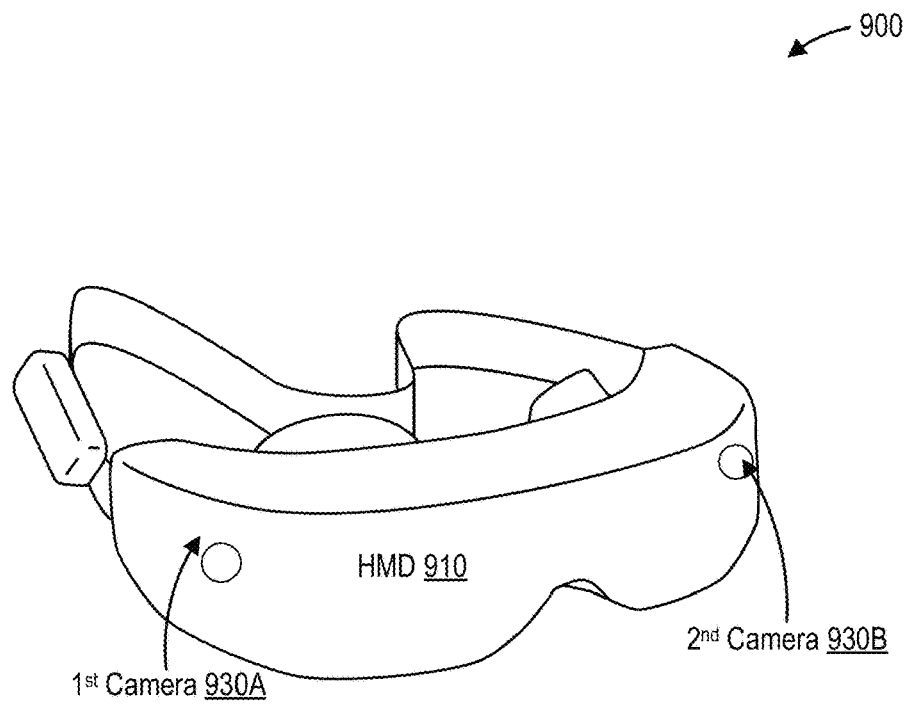
FIG. 9A is a perspective diagram illustrating a head-mounted display (HMD) that performs feature tracking and/or visual simultaneous localization and mapping (VSLAM), in accordance with some examples.

FIG. 9A is a perspective diagram 900 illustrating a head-mounted display (HMD) 910 that performs feature tracking and/or visual simultaneous localization and mapping (VSLAM), in accordance with some examples. The HMD 910 may be, for example, an augmented reality (AR) headset, a virtual reality (VR) headset, a mixed reality (MR) headset, an extended reality (XR) headset, or some combination thereof. The HMD 910 may be an example of an XR system 200. The HMD 910 may include the lens assembly 300 of FIG. 3. The HMD 910 includes a first camera 930A and a second camera 930B along a front portion of the HMD 910. The first camera 930A and the second camera 930B may be two of the one or more cameras. In some examples, the HMD 910 may only have a single camera. In some examples, the HMD 910 may include one or more additional cameras in addition to the first camera 930A and the second camera 930B. In some examples, the HMD 910 may include one or more additional sensors in addition to the first camera 930A and the second camera 930B.

Figure 9B:
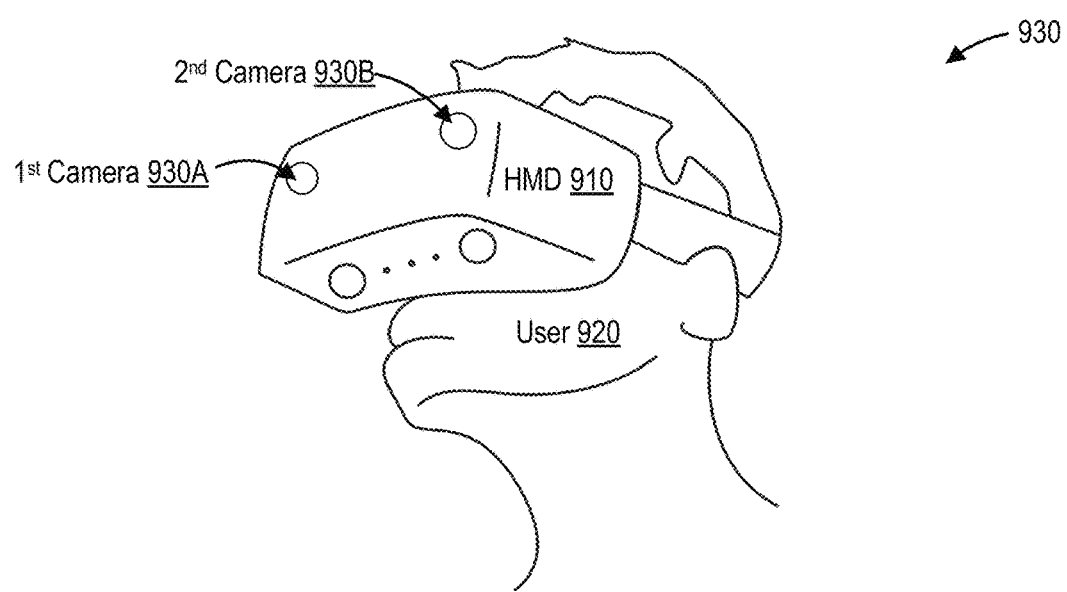
FIG. 9B is a perspective diagram illustrating the head-mounted display (HMD) of FIG. 9A being worn by a user, in accordance with some examples.

FIG. 9B is a perspective diagram 930 illustrating the head-mounted display (HMD) 910 of FIG. 9A being worn by a user 920, in accordance with some examples. The user 920 wears the HMD 910 on the user 920's head over the user 920's eyes. The HMD 910 can capture images with the first camera 930A and the second camera 930B. In some examples, the HMD 910 displays one or more display images toward the user 920's eyes that are based on the images captured by the first camera 930A and the second camera 930B. The display images may provide a stereoscopic view of the environment, in some cases with information overlaid and/or with other modifications. For example, the HMD 910 can display a first display image to the user 920's right eye, the first display image based on an image captured by the first camera 930A. The HMD 910 can display a second display image to the user 920's left eye, the second display image based on an image captured by the second camera 930B. For instance, the HMD 910 may provide overlaid information in the display images overlaid over the images captured by the first camera 930A and the second camera 930B.

The HMD 910 may include no wheels, propellers or other conveyance of its own. Instead, the HMD 910 relies on the movements of the user 920 to move the HMD 910 about the environment. In some cases, for instance where the HMD 910 is a VR headset, the environment may be entirely or partially virtual. If the environment is at least partially virtual, then movement through the virtual environment may be virtual as well. For instance, movement through the virtual environment can be controlled by an input device 208. The movement actuator may include any such input device 208. Movement through the virtual environment may not require wheels, propellers, legs, or any other form of conveyance. Even if an environment is virtual, SLAM techniques may still be valuable, as the virtual environment can be unmapped and/or may have been generated by a device other than the HMD 910, such as a remote server or console associated with a video game or video game platform. In some cases, feature tracking and/or SLAM may be performed in a virtual environment even by a vehicle or other device that has its own physical conveyance system that allows it to physically move about a physical environment. For example, SLAM may be performed in a virtual environment to test whether a SLAM system is working properly without wasting time or energy on movement and without wearing out a physical conveyance system.

Figure 10A:
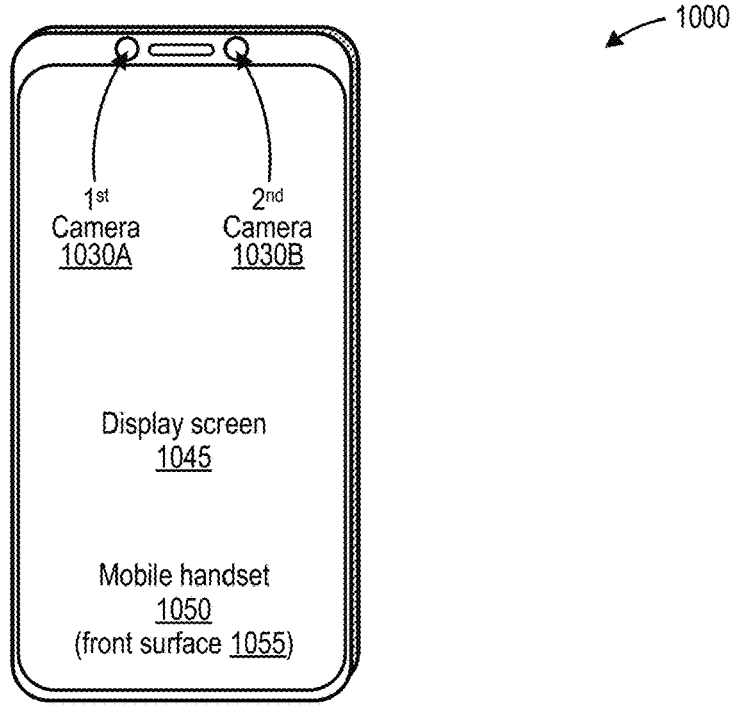
FIG. 10A is a perspective diagram illustrating a front surface of a mobile device that performs feature tracking and/or visual simultaneous localization and mapping (VSLAM) using one or more front-facing cameras, in accordance with some examples.

FIG. 10A is a perspective diagram 1000 illustrating a front surface 1055 of a mobile device 1050 that performs features described here, including, for example, feature tracking and/or visual simultaneous localization and mapping (VSLAM) using one or more front-facing cameras 1030A-B, in accordance with some examples. The mobile device 1050 may be, for example, a cellular telephone, a satellite phone, a portable gaming console, a music player, a health tracking device, a wearable device, a wireless communication device, a laptop, a mobile device, any other type of computing device or computing system 1200 discussed herein, or a combination thereof. The front surface 1055 of the mobile device 1050 includes a display screen 1045. The front surface 1055 of the mobile device 1050 includes a first camera 1030A and a second camera 1030B. The first camera 1030A and the second camera 1030B are illustrated in a bezel around the display screen 1045 on the front surface 1055 of the mobile device 1050. In some examples, the first camera 1030A and the second camera 1030B can be positioned in a notch or cutout that is cut out from the display screen 1045 on the front surface 1055 of the mobile device 1050. In some examples, the first camera 1030A and the second camera 1030B can be under-display cameras that are positioned between the display screen 1045 and the rest of the mobile device 1050, so that light passes through a portion of the display screen 1045 before reaching the first camera 1030A and the second camera 1030B. The first camera 1030A and the second camera 1030B of the perspective diagram 1000 are front-facing cameras. The first camera 1030A and the second camera 1030B face a direction perpendicular to a planar surface of the front surface 1055 of the mobile device 1050. The first camera 1030A and the second camera 1030B may be two of the one or more cameras. In some examples, the front surface 1055 of the mobile device 1050 may only have a single camera. In some examples, the mobile device 1050 may include one or more additional cameras in addition to the first camera 1030A and the second camera 1030B. In some examples, the mobile device 1050 may include one or more additional sensors in addition to the first camera 1030A and the second camera 1030B.

Figure 10B:
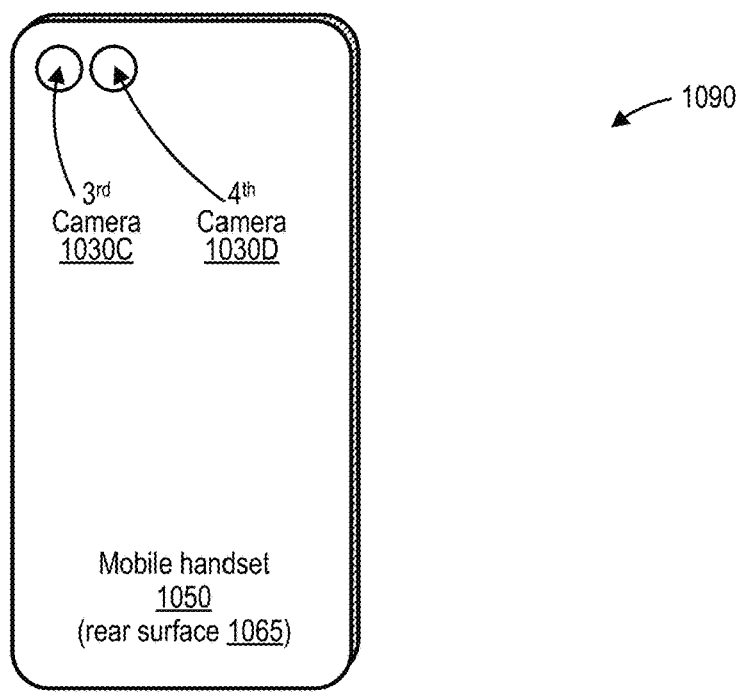
FIG. 10B is a perspective diagram illustrating a rear surface of a mobile device, in accordance with aspects of the present disclosure.

FIG. 10B is a perspective diagram 1030 illustrating a rear surface 1065 of a mobile device 1050. The mobile device 1050 includes a third camera 1030C and a fourth camera 1030D on the rear surface 1065 of the mobile device 1050. The third camera 1030C and the fourth camera 1030D of the perspective diagram 1090 are rear-facing. The third camera 1030C and the fourth camera 1030D face a direction perpendicular to a planar surface of the rear surface 1065 of the mobile device 1050. While the rear surface 1065 of the mobile device 1050 does not have a display screen 1045 as illustrated in the perspective diagram 1090, in some examples, the rear surface 1065 of the mobile device 1050 may have a second display screen. If the rear surface 1065 of the mobile device 1050 has a display screen 1045, any positioning of the third camera 1030C and the fourth camera 1030D relative to the display screen 1045 may be used as discussed with respect to the first camera 1030A and the second camera 1030B at the front surface 1055 of the mobile device 1050. The third camera 1030C and the fourth camera 1030D may be two of the one or more cameras. In some examples, the rear surface 1065 of the mobile device 1050 may only have a single camera. In some examples, the mobile device 1050 may include one or more additional cameras in addition to the first camera 1030A, the second camera 1030B, the third camera 1030C, and the fourth camera 1030D. In some examples, the mobile device 1050 may include one or more additional sensors in addition to the first camera 1030A, the second camera 1030B, the third camera 1030C, and the fourth camera 1030D.

Like the HMD 910, the mobile device 1050 includes no wheels, propellers, or other conveyance of its own. Instead, the mobile device 1050 relies on the movements of a user holding or wearing the mobile device 1050 to move the mobile device 1050 about the environment. In some cases, for instance where the mobile device 1050 is used for AR, VR, MR, or XR, the environment may be entirely or partially virtual. In some cases, the mobile device 1050 may be slotted into a head-mounted device (HMD) (e.g., into a cradle of the HMD) so that the mobile device 1050 functions as a display of the HMD, with the display screen 1045 of the mobile device 1050 functioning as the display of the HMD. If the environment is at least partially virtual, then movement through the virtual environment may be virtual as well. For instance, movement through the virtual environment can be controlled by one or more joysticks, buttons, video game controllers, mice, keyboards, trackpads, and/or other input devices that are coupled in a wired or wireless fashion to the mobile device 1050.

FIG. 11 is a diagram illustrating an example of a computing system 1100 for implementing certain aspects of the present technology. The computing system 1100 can be or can be part of any computing device such as, for example, an extended reality device (e.g., a virtual reality (VR) device, an augmented reality (AR) device, or a mixed reality (MR) device), a mobile device (e.g., a mobile telephone or other mobile device), a wearable device (e.g., a network-connected watch or other wearable device), a personal computer, a laptop computer, a server computer, a television, a video game console, or other device, or any component thereof, in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some examples, computing system 1100 may be a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example computing system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, camera, accelerometers, gyroscopes, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.10 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some examples, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the present disclosure include:

Aspect 1. A method for eye tracking, comprising: obtaining an image of an eye, the image of the eye including a glint of light from a light source; determining information associated with the glint of light based on the image of the eye; obtaining one or more target glint parameter values; comparing the information associated with the glint of light to the one or more target glint parameter values; and adjusting an amount of power for the light source based on comparing the information associated with the glint of light and the one or more target glint parameter values.

Aspect 2. The method of Aspect 1, wherein the information associated with the glint of light comprises a set of parameters including an area of the glint of light and a maximum brightness value of the glint of light.

Aspect 3. The method of any of Aspects 1-2, wherein comparing the information associated with the glint of light to the one or more target glint parameter values comprises comparing a parameter of the information associated with the glint of light to a set of thresholds of a corresponding parameter value of the one or more target glint parameter values.

Aspect 4. The method of any of Aspects 1-3, wherein comparing the information associated with the glint of light to the one or more target glint parameter values comprises comparing a parameter of the information associated with the glint of light to a corresponding target parameter value of the one or more target glint parameter values.

Aspect 5. The method of any of Aspects 1-4, wherein adjusting the amount of power comprises increasing or decreasing an amount of power provided to the light source.

Aspect 6. The method of any of Aspects 1-5, wherein the light source comprises one or more infrared light sources.

Aspect 7. The method of any of Aspects 1-6, wherein the glint of light comprises light from the light source scattered or reflected from the eye.

Aspect 8. The method of any of Aspects 1-7, wherein the one or more target glint parameter values are predetermined based on eye tracker glint characteristics associated with an eye tracker.

Aspect 9. The method of any of Aspects 1-8, wherein adjusting the amount of power for the light source compensates for aging of the light source.

Aspect 10. An apparatus for eye tracking, comprising: at least one memory; and at least one processor coupled to the at least one memory and configured to: obtain an image of an eye, the image of the eye including a glint of light from a light source; determine information associated with the glint of light based on the image of the eye; obtain one or more target glint parameter values; compare the information associated with the glint of light to the one or more target glint parameter values; and adjust an amount of power for the light source based on comparing the information associated with the glint of light and the one or more target glint parameter values.

Aspect 11. The apparatus of Aspect 10, wherein the information associated with the glint of light comprises a set of parameters including an area of the glint of light and a maximum brightness value of the glint of light.

Aspect 12. The apparatus of any of Aspects 10-11, wherein, to compare the information associated with the glint of light to the one or more target glint parameter values, the at least one processor is configured to compare a parameter of the information associated with the glint of light to a set of thresholds of a corresponding parameter value of the one or more target glint parameter values.

Aspect 13. The apparatus of any of Aspects 10-12, wherein, to compare the information associated with the glint of light to the one or more target glint parameter values, the at least one processor is configured to compare a parameter of the information associated with the glint of light to a corresponding target parameter value of the one or more target glint parameter values.

Aspect 14. The apparatus of any of Aspects 10-13, wherein, to adjust the amount of power, the at least one processor is configured to increase or decrease an amount of power provided to the light source.

Aspect 15. The apparatus of any of Aspects 10-14, wherein the light source comprises one or more infrared light sources.

Aspect 16. The apparatus of any of Aspects 10-15, wherein the glint of light comprises light from the light source scattered or reflected from the eye.

Aspect 17. The apparatus of any of Aspects 10-16, wherein the one or more target glint parameter values are predetermined based on eye tracker glint characteristics associated with an eye tracker.

Aspect 18. The apparatus of any of Aspects 10-17, wherein adjusting the amount of power for the light source compensates for aging of the light source.

Aspect 19. A non-transitory computer-readable medium having stored thereon instructions that, when executed by at least one processor, cause the at least one processor to: obtain an image of an eye, the image of the eye including a glint of light from a light source; determine information associated with the glint of light based on the image of the eye; obtain one or more target glint parameter values; compare the information associated with the glint of light to the one or more target glint parameter values; and adjust an amount of power for the light source based on comparing the information associated with the glint of light and the one or more target glint parameter values.

Aspect 20. The non-transitory computer-readable medium of Aspect 19, wherein the information associated with the glint of light comprises a set of parameters including an area of the glint of light and a maximum brightness value of the glint of light.

Aspect 21. The non-transitory computer-readable medium of any of Aspects 19-20, wherein, to compare the information associated with the glint of light to the one or more target glint parameter values, the instructions cause the at least one processor to compare a parameter of the information associated with the glint of light to a set of thresholds of a corresponding parameter value of the one or more target glint parameter values.

Aspect 22. The non-transitory computer-readable medium of any of Aspects 19-21, wherein, to compare the information associated with the glint of light to the one or more target glint parameter values, the instructions cause the at least one processor to compare a parameter of the information associated with the glint of light to a corresponding target parameter value of the one or more target glint parameter values.

Aspect 23. The non-transitory computer-readable medium of any of Aspects 19-22, wherein, to adjust the amount of power, the instructions cause the at least one processor to increase or decrease an amount of power provided to the light source.

Aspect 24. The non-transitory computer-readable medium of any of Aspects 19-23, wherein the light source comprises one or more infrared light sources.

Aspect 25. The non-transitory computer-readable medium of any of Aspects 19-24, wherein the glint of light comprises light from the light source scattered or reflected from the eye.

Aspect 26. The non-transitory computer-readable medium of any of Aspects 19-25, wherein the one or more target glint parameter values are predetermined based on eye tracker glint characteristics associated with an eye tracker.

Aspect 27. The non-transitory computer-readable medium of any of Aspects 19-26, wherein adjusting the amount of power for the light source compensates for aging of the light source.

Aspect 28. An apparatus for eye tracking, comprising: means for obtaining an image of an eye, the image of the eye including a glint of light from a light source; means for determining information associated with the glint of light based on the image of the eye; means for obtaining one or more target glint parameter values; means for comparing the information associated with the glint of light to the one or more target glint parameter values; and means for adjusting an amount of power for the light source based on comparing the information associated with the glint of light and the one or more target glint parameter values.

Aspect 29. The apparatus of Aspect 28, wherein the information associated with the glint of light comprises a set of parameters including an area of the glint of light and a maximum brightness value of the glint of light.

Aspect 30. The apparatus of any of Aspects 28-29, wherein comparing the information associated with the glint of light to the one or more target glint parameter values comprises comparing a parameter of the information associated with the glint of light to a set of thresholds of a corresponding parameter value of the one or more target glint parameter values.

Aspect 34: An apparatus for image generation, comprising means for performing one or more of operations according to any of Aspects 1 to 9.

What is claimed is:
1. A method for eye tracking, comprising:
obtaining an image of an eye, the image of the eye including a glint of light from a light source;
determining information associated with the glint of light based on the image of the eye, wherein the information associated with the glint of light is determined based on a gaussianized brightness of pixels associated with the glint, wherein the gaussianized brightness normalizes the brightness of pixels of the glint of light;

obtaining target glint parameter values, the target glint parameter values including a set of threshold target values for the information associated with the glint of light;

comparing the information associated with the glint of light to the target glint parameter values to determine whether the information associated with the glint of light is between threshold target values of the set of threshold target values; and adjusting an amount of power for the light source based on comparing the information associated with the glint of light and the target glint parameter values.

2. The method of claim 1, wherein the information associated with the glint of light comprises a set of parameters including an area of the glint of light and a brightness value of the glint of light.

3. The method of claim 1, wherein adjusting the amount of power comprises increasing or decreasing an amount of power provided to the light source.

4. The method of claim 1, wherein the light source comprises one or more infrared light sources.

5. The method of claim 1, wherein the glint of light comprises light from the light source scattered or reflected from the eye.

6. The method of claim 1, wherein the target glint parameter values are predetermined based on eye tracker glint characteristics associated with an eye tracker.

7. The method of claim 1, wherein adjusting the amount of power for the light source compensates for aging of the light source.

8. An apparatus for eye tracking, comprising:
at least one memory; and
at least one processor coupled to the at least one memory and configured to:
obtain an image of an eye, the image of the eye including a glint of light from a light source;
determine information associated with the glint of light based on the image of the eye, wherein the information associated with the glint of light is determined based on a gaussianized brightness of pixels associated with the glint, wherein the gaussianized brightness normalizes the brightness of pixels of the glint of light;
obtain target glint parameter values, the target glint parameter values including a set of threshold target values for the information associated with the glint of light;
compare the information associated with the glint of light to the target glint parameter values to determine whether the information associated with the glint of light is between threshold target values of the set of threshold target values; and
adjust an amount of power for the light source based on comparing the information associated with the glint of light and the target glint parameter values.

9. The apparatus of claim 8, wherein the information associated with the glint of light comprises a set of parameters including an area of the glint of light and a brightness value of the glint of light.

10. The apparatus of claim 8, wherein, to adjust the amount of power, the at least one processor is configured to increase or decrease an amount of power provided to the light source.

11. The apparatus of claim 8, wherein the light source comprises one or more infrared light sources.

12. The apparatus of claim 8, wherein the glint of light comprises light from the light source scattered or reflected from the eye.

13. The apparatus of claim 8, wherein the target glint parameter values are predetermined based on eye tracker glint characteristics associated with an eye tracker.

14. The apparatus of claim 8, wherein adjusting the amount of power for the light source compensates for aging of the light source.

15. A non-transitory computer-readable medium having stored thereon instructions that, when executed by at least one processor, cause the at least one processor to:
obtain an image of an eye, the image of the eye including a glint of light from a light source, wherein the information associated with the glint of light is determined based on a gaussianized brightness of pixels associated with the glint, wherein the gaussianized brightness normalizes the brightness of pixels of the glint of light;
determine information associated with the glint of light based on the image of the eye;
obtain target glint parameter values, the target glint parameter values including a set of threshold target values for the information associated with the glint of light;
compare the information associated with the glint of light to the target glint parameter values to determine whether the information associated with the glint of light is between threshold target values of the set of threshold target values; and
adjust an amount of power for the light source based on comparing the information associated with the glint of light and the target glint parameter values.

16. The non-transitory computer-readable medium of claim 15, wherein the information associated with the glint of light comprises a set of parameters including an area of the glint of light and a rightness value of the glint of light.

17. The non-transitory computer-readable medium of claim 15, wherein, to adjust the amount of power, the instructions cause the at least one processor to increase or decrease an amount of power provided to the light source.

18. The non-transitory computer-readable medium of claim 15, wherein the light source comprises one or more infrared light sources.

19. The non-transitory computer-readable medium of claim 15, wherein the glint of light comprises light from the light source scattered or reflected from the eye.

20. The non-transitory computer-readable medium of claim 15, wherein the target glint parameter values are predetermined based on eye tracker glint characteristics associated with an eye tracker.

21. The non-transitory computer-readable medium of claim 15, wherein adjusting the amount of power for the light source compensates for aging of the light source.

22. An apparatus for eye tracking, comprising:
means for obtaining an image of an eye, the image of the eye including a glint of light from a light source;
means for determining information associated with the glint of light based on the image of the eye, wherein the information associated with the glint of light is determined based on a gaussianized brightness of pixels associated with the glint, wherein the gaussianized brightness normalizes the brightness of pixels of the glint of light;
means for obtaining target glint parameter values, the target glint parameter values including a set of threshold target values for the information associated with the glint of light;

means for comparing the information associated with the glint of light to the target glint parameter values to determine whether the information associated with the glint of light is between threshold target values of the set of threshold target values; and means for adjusting an amount of power for the light source based on comparing the information associated with the glint of light and the target glint parameter values.

23. The apparatus of claim 22, wherein the information associated with the glint of light comprises a set of parameters including an area of the glint of light and a brightness value of the glint of light.

24. The method of claim 1, wherein the threshold target values are based on a distance between the light source and the eye.

25. The method of claim 1, wherein the image of the eye includes a second glint of light from a second light source, and further comprising:
- determining second information associated with the second glint of light;
- comparing the second information associated with the second glint of light to the target glint parameter values to determine whether the second information associated with the second glint of light is within the threshold target values of the set of threshold target values; and
- adjusting a second amount of power for the second light source based on comparing the second information associated with the second glint of light and the target glint parameter values.

26. The apparatus of claim 8, wherein the threshold target values are based on a distance between the light source and the eye.

27. The apparatus of claim 8, wherein the image of the eye includes a second glint of light from a second light source, and wherein the at least one processor is configured to:
- determine second information associated with the second glint of light;
- compare the second information associated with the second glint of light to the target glint parameter values to determine whether the second information associated with the second glint of light is within the threshold target values of the set of threshold target values; and
- adjust a second amount of power for the second light source based on comparing the second information associated with the second glint of light and the target glint parameter values.

* * * * *